United States Patent [19]

Shoberg

[11] E Patent Number: Re. 32,003

[45] Reissued Date of Patent: Oct. 15, 1985

[54] CONSTANT MOMENT WEIGH SCALE WITH FLOATING FLEXURE BEAM

[76] Inventor: Ralph S. Shoberg, 6176 Briggs Lake Dr., Brighton, Mich. 48116

[21] Appl. No.: 52,078

[22] Filed: Jun. 25, 1979

Related U.S. Patent Documents

Reissue of:

[64] Patent No.: 3,938,603
Issued: Feb. 17, 1976
Appl. No.: 537,090
Filed: Dec. 30, 1974

U.S. Applications:

[62] Division of Ser. No. 537,090, Dec. 30, 1974, Pat. No. 3,938,603.

[51] Int. Cl.[4] ..... G01G 3/14

[52] U.S. Cl. ..... 177/211; 177/DIG. 9

[58] Field of Search ..... 177/211, 256, DIG. 11, 177/DIG. 9

[56] References Cited

U.S. PATENT DOCUMENTS

| | | | |
|---|---|---|---|
| 2,598,812 | 6/1952 | Marco et al. | 177/211 |
| 2,666,262 | 1/1954 | Ruge . | |
| 2,899,191 | 8/1959 | Hunt | 177/211 |
| 3,309,922 | 3/1967 | Green . | |
| 3,443,652 | 5/1969 | Videon | 177/211 X |
| 3,469,645 | 9/1965 | Provi et al. | 177/210 |
| 3,548,650 | 12/1970 | Boadle . | |
| 3,658,143 | 4/1972 | Schwartz | 177/DIG. 9 |
| 3,666,032 | 5/1972 | Maffia et al. | 177/DIG. 9 |
| 3,780,818 | 12/1973 | Lumby et al. | 177/256 |
| 3,805,905 | 4/1974 | McClusky | 177/DIG. 11 |
| 3,831,687 | 8/1974 | Maffia et al. | 177/211 |

OTHER PUBLICATIONS

Electronic Flexure Base Scale, Electro-Numerics Corporation, 15 Third Street, Santa Rosa, California.

Digiflex Scales, National Controls, Inc., P.O. Box 1501, Santa Rosa, California 95403.

*Primary Examiner*—George H. Miller, Jr.

*Attorney, Agent, or Firm*—Krass & Young

[57] ABSTRACT

A weigh scale apparatus in which forces caused by the applied load are transformed into moments of opposite sense and applied to opposite ends of a substantially rigid beam. Deflection of the beam is measured by centrally disposed strain gage resistors to produce an electrical signal quantity proportional to the applied load. The conversion of applied load to moments of opposite sense is accomplished by a pair of spaced parallel pivot members which are suspended by straps between the load receiving pan and the base such that the pivots tend to rotate in opposite directions. The beam is mechanically connected between the pivots such that it is subjected to the bending moment over substantially its entire length. A split scale device is provided by a composite pan, one portion of which is connected to the pivots directly and another portion of which is connected to the pivots through long lever arms to provide moment multiplication. A vibrator device for dithering the pivots is provided.

21 Claims, 10 Drawing Figures

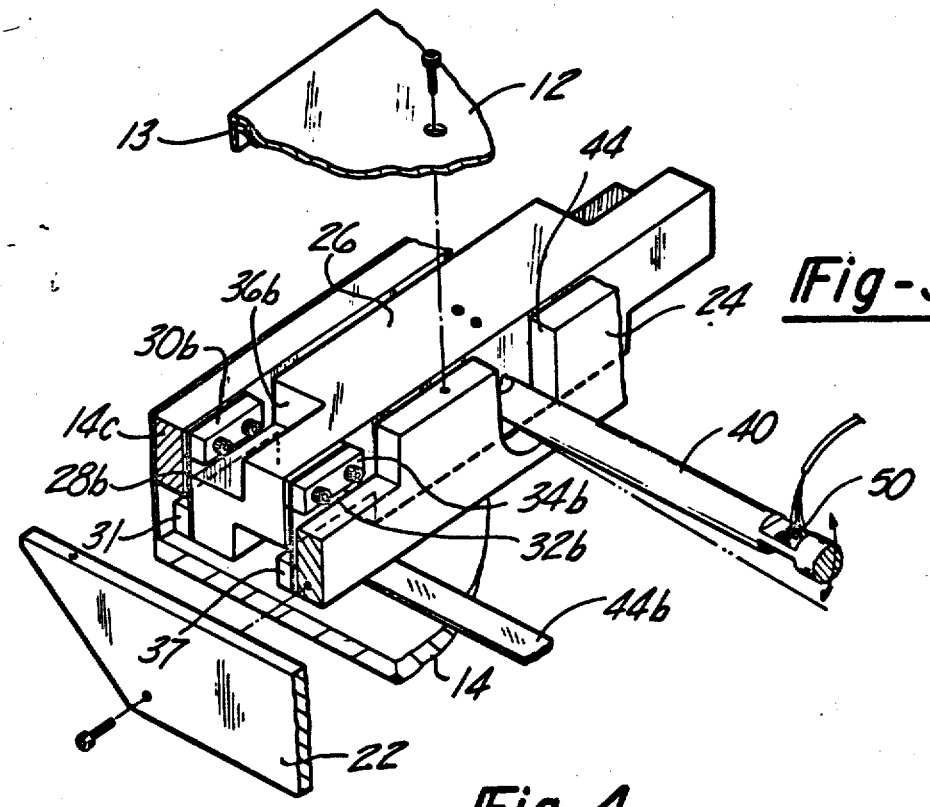
Fig-3
Fig-4
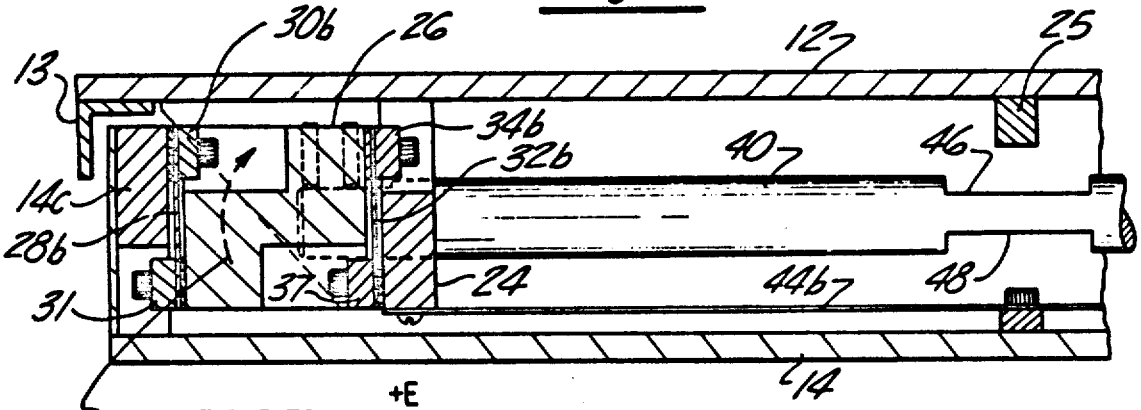
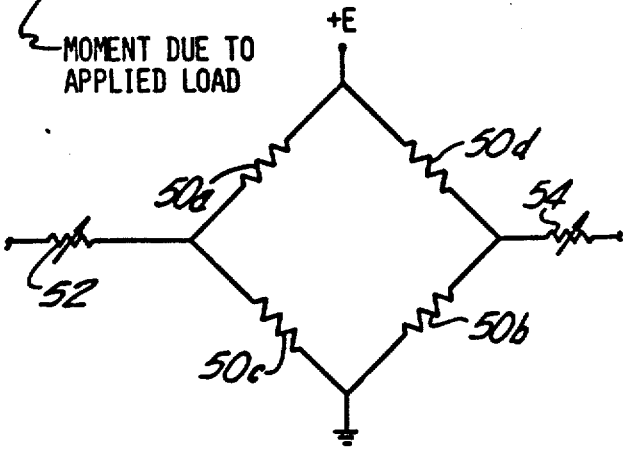
Fig-5
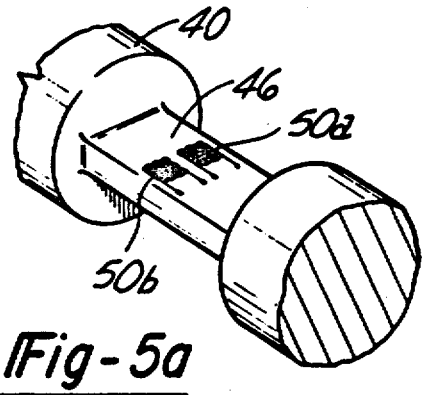
Fig-5a

CONSTANT MOMENT WEIGH SCALE WITH FLOATING FLEXURE BEAM

Matter enclosed in heavy brackets [ ] appears in the original patent but forms no part of this reissue specification; matter printed in italics indicates the additions made by reissue.

*This application and Serial No. 06/052077 are divisional reissue applications of Serial No. 05/537,090, filed Dec. 30, 1974, which issued as U.S. Pat. 3,938,603.*

INTRODUCTION

This invention relates to weight scale apparatus and particularly to a scale which employes a beam-type flexure element and means to detect bending of the beam as a measure of applied load.

BACKGROUND OF THE INVENTION

Weigh scale apparatus, other than the laboratory balance type, typically comprises a spring element such as a coil or wrapped spring or a torsion bar which is deflected in proportion to applied loads. The traditional means for sensing spring deflection are such that it is difficult and expensive to attain a high degree of accuracy. Thus, an inexpensive device is typically not precise in its measurements. Moreover, the prior art scales are also typically quite sensitive to the point on the pan or load receiving surface at which the load is applied; i.e., a non-centered load on the pan tends to produce an inaccurate reading.

The present invention overcomes the disadvantages of the prior art by providing a scale which can be manufactured so as to produce an extremely high degree of accuracy with relatively little expense and which, in a preferred form, is relatively insensitive to non-centered load applications.

BRIEF SUMMARY OF THE INVENTION

As stated above, the present invention provides a weigh scale apparatus having an entirely novel sensing principle which, because of the simplicity of the implementation of the principle, is capable of producing high accuracy at relatively little cost. Moreover, the invention is susceptible of implementation in various forms for a wide variety of applications ranging from food weighing scales for supermarkets to livestock elevators, grain elevators, highway vehicle scales, to extremely sensitive devices such as those used in the laboratory.

In general, the principle of the present invention involves the transformation of an applied load into moments which in turn are applied to opposite ends of a beam of high modulus of elasticity material so as to cause elastic deflection of the beam. Means such as strain gages are provided for the measurement of the deflection stress in the beam as an indication of the applied load.

As hereinafter set forth in greater detail, the invention may be embodied in a weight scale apparatus having a base and a load receiving member such as a pan, a pair of pivot members spaced apart and disposed mechanically between the pan and the base so as to experience a turning moment when a load is applied to the pan. The term "pivot" as used herein shall be understood to refer to a mechanical device which is so mounted in the scale as to be subject to the turning moment when the load is applied, the actual rotation or angular deflection of such a device being so minimal as to be substantially imperceptible to the human eye and thus requiring no elaborate or commonly conceived bearings to allow for extensive angular rotation. Connected to and hence "floating" between the two pivot members is a beam of high modulus of elasticity material such as steel or aluminum. By virtue of the mechanical connection of the beam to the pivot members the turning moments of the pivot members are applied to the opposite ends of the beam thus to cause a bending deflection of the beam. Means are provided at the center of the beam for measuring the tension and compression forces in the beam due to bending and for providing an output signal which is indicative of applied loads. The beam is so machined as to define at the center thereof a flexure area of reduced cross section which tends to concentrate the bending stress in this area. Moreover, means such as strain gage resistors are bonded into intimate contact with the flexure area so as to produce an electrical signal which, upon suitable amplification, indicates the applied load as a function of the bending stress in the beam.

Various specific features of the invention are also described herein including, as examples, a force multiplying lever arm arrangement and a split pan; i.e., a pan having one area of a first scale sensitivity and another area for a second scale sensitivity thus to be capable of weighing objects in vastly dissimilar weight ranges to substantially the same degree of accuracy; another example involves the use of a vibrator or similar device in the scale to dither the mechanical components of the pivot assembly thus to produce a "live" apparatus having no noticeable friction or hysteresis characteristics. Various other features and advantages of the invention will become apparent from a reading of the following specification.

BRIEF DESCRIPTION OF THE DRAWINGS

FIG. 3 is a perspective view of representive interior details in the weigh scale apparatus of FIG. 1;

FIG. 4 is a side view partly in section of the interior details of the weigh scale apparatus of FIG. 1;

FIG. 5 is schematic circuit diagram of a bridge circuit for the bending stress monitoring system applicable to the beam of the apparatus of FIGS. 1 through 4;

FIG. 5a is a perspective view of the central portion of the beam illustrating the disposition of strain gage resistors on a flexure area thereof;

DETAILED DESCRIPTION OF THE SPECIFIC EMBODIMENTS

Figure 1:
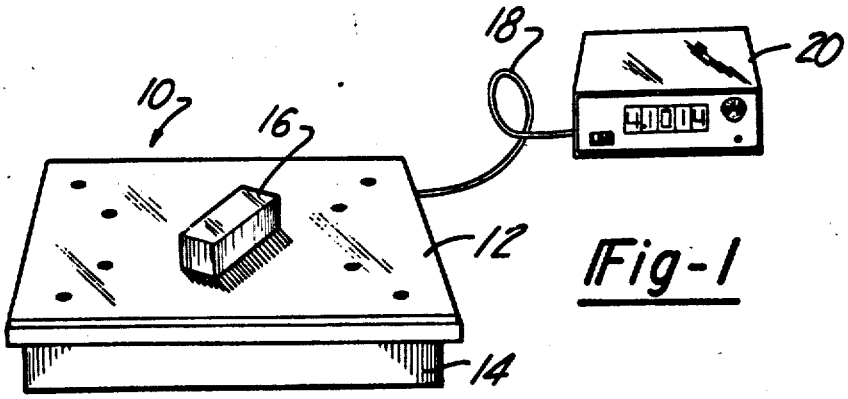
FIG. 1 is a perspective view of a weigh scale apparatus embodying the invention and comprising a digital readout or display device.

Looking first to FIG. 1 an illustrative weigh scale apparatus 10 designed for general purpose usage is shown to comprise a flat pan 12 approximately eleven inches by seventeen inches disposed on a rectangular aluminum base 14 for receiving and weighing objects 16. Weigh scale apparatus 10 responds to objects 16 to produce an electrical signal which is conducted through multiconductor cable 18 to a digital type display unit 20. The unit 20 is responsive to an electrical signal voltage of varying amplitude to provide a temporary visual display of a number which represents the weight of the object 16 in a selected measurement system. Brightness and other operating characteristics of the unit 20 may be controlled as desired; the device 20 is a commercially available device and, while it is representative of one of a wide variety of display or other readout devices which can be employed with the invention, it actually forms no part of the invention and hence will not be described in detail herein.

Looking now to FIGS. 2 through 4 of the interior details of the weigh scale apparatus 10 will be described in greater detail. The pan 12 is essentially a rectangular body of substantially rigid material such as aluminum or steel having a depending peripheral lip or flange 13 as best shown in FIG. 3 and having discretely located holes which receive fasteners so as to permit the pan to be intimately and closely mechanically secured to parallel rails 22a and 22b which are disposed within the confines of the base 14. The base itself comprises a thin floor bounded by outer longitudinal rails 14a and 14b and side rails 14c all secured together by machine screws, welds and combinations thereof.

Longitudinal rails 22a and 22b provide flat horizontal surfaces which receive the interior surface of the pan 12 thereon and hold the pan out of physical contact with any portion of the rectangular base 14. Longitudinal rails 22a and 22b are interconnected by transversely extending members 24 only the lefthand member of which is shown in FIGS. 2 and 3, it being understood that another such rail is reversely similarly arranged about the centerline of the assembly defined by the transversely extending stiffener strap 25. The upper surface of rail member 24 is in the same plane as the upper surfaces of rails 22a and 22b and hence helps support the flat interior surface of the pan 12.

Figure 2:
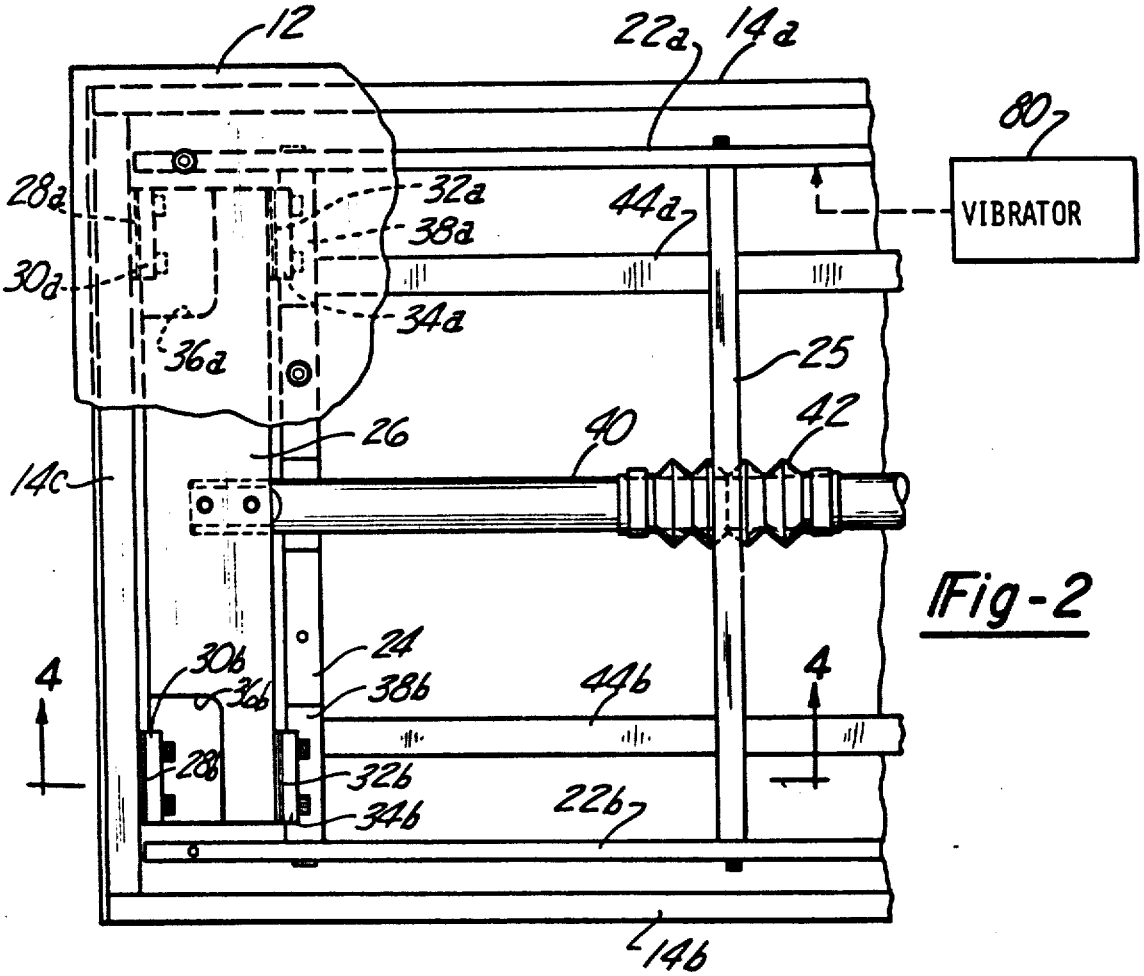
FIG. 2 is a plan view of a representative portion of the weigh scale apparatus of FIG. 1 with the cover or pan removed so as to show the interior details thereof.

Mechanically suspended between the pan 12 and the base 14 and out of direct physical contact therewith is a pair of reversely similar pivot members 26 made of heavy machined material such as aluminum, one such pivot member at each longitudinal end of the assembly shown in FIGS. 2 through 4. The suspension of pivot 26 is accomplished by steel strap assemblies 28 and 32 such that loads applied to the pan 12, such as by placing an object 16 on the pan, produce turning moments of opposite sense in the two longitudinally spaced and parallel pivot members 26 of the weigh scale 10, such turning moments tending to rotate the pivot members about their own longitudinal axes, such axes being parallel and in a plane which is parallel to the plane of the pan 10 and perpendicular to the longitudinal axis of the overall device. Straps 28a and 28b are connected at the top to the base rail 14c and depend vertically therefrom so as to be secured at the bottom of the outside surface of the pivot member 26 shown in FIGS. 2, 3, and 4. Strap clamps 30a and 30b are provided for clamping the strap to the base rail 14c as best shown in FIGS. 2 and 3. Strap clamps 31 are provided at the lower end of each of the straps 28 to secure the straps to the pivot member 26 as best shown in FIGS. 3 and 4. Note in FIG. 2 that recesses 36a and 36b are provided to accommodate the clamps 30a and 30b respectively. In addition, straps 32a and 32b are secured at the tops thereof to the inside lateral surface of the pivot 26 and depend vertically therefrom to be secured at the bottom to the outside surface of the transversely extending load receiving rail 24. Upper strap clamps 34a and 34b are provided for securing the strap to the pivot 26 while lower strap clamp 37 is evident in FIGS. 3 and 4 to secure the straps at the lower end thereof. As is evident in FIGS. 2, 3, and 4 there are four straps at each end of the apparatus 10 for a total of eight straps each of which is made of spring steel and measures approximately 1.5 inches in width by 3.5 inches in length by 0.006 inches in thickness. All of the dimensions given in this application are strictly by way of illustration and none is to be construed as critical unless so identified.

The disposition of the straps as best shown in FIG. 3 is such as to stably support the pivot 26 between the pan and the base such that when a load is applied to the pan 12 it is transmitted directly to the transversely extending member 24 which, as previously described, is spaced from the base 14. Therefore this load tends to pull down on the straps 32a and 32b. Since the vertical reaction force in straps 28a and 28b appears at the longitudinally opposite surfaces and in the opposite sense the applied load tends to rotate pivot 26 in the clockwise direction as shown in FIGS. 3 and 4. It will be understood that since a reversely similar apparatus is provided at the right end of the assembly 10 as partially shown in FIGS. 2, 3, and 4, a reversely similar pivot experiences a turning moment of opposite sense in response to the applied load.

To resist as well as to measure the turning moments a solid aluminum beam 40 is mechanically connected to and between the pivots 26. This may be accomplished by machining suitable apertures through the sides of the pivots 26 and forming flats on the otherwise round stock of the beam 40, inserting the flat ends of the beam 40 into the apertures and providing set screws such as shown in FIGS. 3 and 4 for securing the beam 40 in place. Since the beam, although substantially rigid, is actually subject to bending deflection, the moment being substantially constant across the length of the beam 40 for a centered load. However, the moment at precisely the center of the beam 40 is of a given value irrespective of the position of the object 16 on the pan 10 and hence the point of application of the load. For this purpose, strain sensing means hereinafter described in greater detail are disposed on the beam 40 as shown in FIGS. 3 and 4 for the purpose of sensing the bending stress and generating an electrical signal quantity related thereto, such electrical signal quantity being indicative of the magnitude of the applied load and hence being applicable to the display device 20 in the manner described with reference to FIG. 1. A pleated flexible boot 42 is preferably clamped onto the beam 40 so as to protect the sensitive components of the strain sensing apparatus.

Antisway straps 44a and 44b are preferably provided, such straps being secured at the centers thereof to the base 14 and at the outer ends thereof to the members 24 to prevent any longitudinal swaying of the assembly comprising the pivot which, as will be apparent by inspection of FIGS. 3 and 4, actually floats between the pan and the base to provide the transformation of the applied load into the turning moments as previously described.

Continuing with the description of FIGS. 2 through it can be seen that cutouts 38a and 38b in the lateral extending member 24 provide clearance for the clamp blocks 34a and 34b respectively and similarly a recess is provided at each end of the pivot 26 as best shown in FIGS. 3 and 4 to accommodate the clamp blocks 37. The member 24 is machined to provide a relief 44 in the center thereof to accommodate the beam 40 as best shown in FIG. 3. As also shown in FIGS. 3 and 4 cushion type spacers may be afforded between the clamp blocks and the straps as desired. Various other details also appear from the drawings and, because they will be of apparent importance to one skilled in the art, no specific description will be provided.

To increase the sensitivity of the weigh scale device the center of the beam 40 is flattened as shown in FIGS. 3 and 4 to provide parallel flat surfaces 46 and 48 on which are bonded adjacent sets of strain gage resistors, two adjacent resistors on the top flat 46 and two adjacent resistors on the bottom flat 48. The resistors 50a and 50b are preferably disposed on the top flat 46 as shown in FIG. 5a with the second pair of resistors 50c and 50d being disposed on the bottom flat in substantially the same orientation. In this orientation, the resistors on flat 46 respond to compression in the beam 40 while the resistors on flat 48 respond to tension. Thus, bending stress caused by the turning moments is sensed. Although it is not essential, it is preferred to connect the four strain gage resistors into a bridge circuit as shown in FIG. 5, so that the tension and compression valves add. A dc source is connected across one pair of terminals as indicated, the other terminals serving as outputs to the display device as previously described. In FIG. 5 the output terminals are further provided with temperature sensitive compensating resistors 52 and 54 to compensate for temperature changes which may occur between original calibration of the device and the actual time of use.

Figure 6:
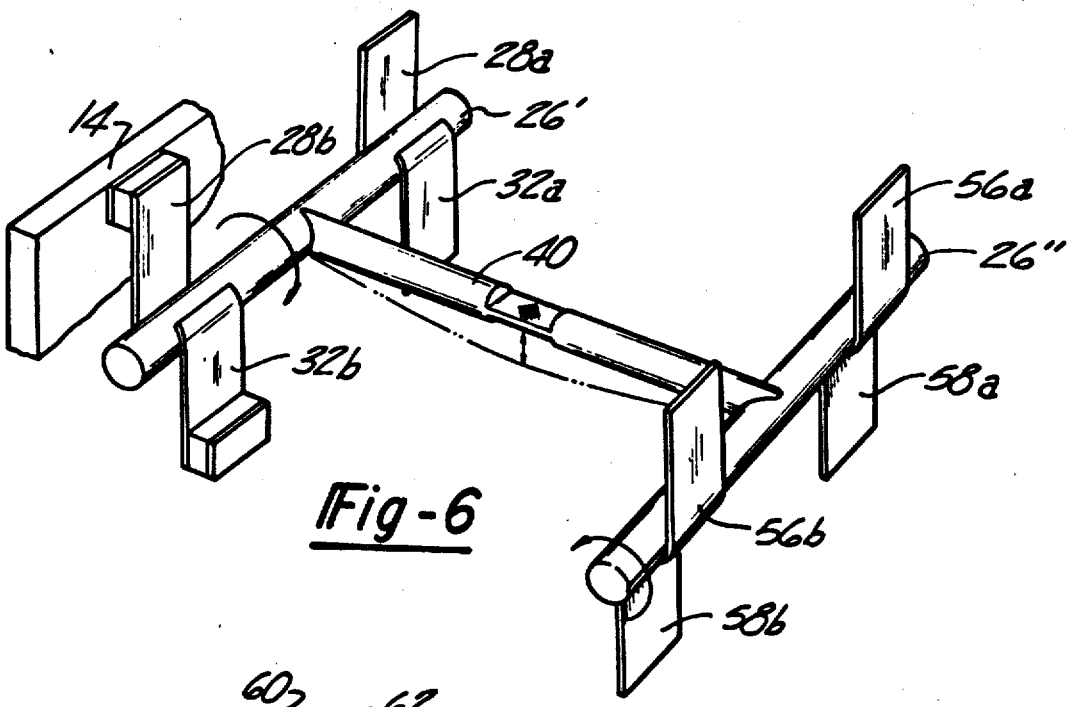
FIG. 6 is a schematic mechanical drawing of a strap-type pivot and beam support system of the weigh scale apparatus of FIGS. 1 through 4.

The operation of the device of FIGS. 1 through 4 is believed to be clearly apparent from the somewhat mechanically schematisized drawing of FIG. 6. In FIG. 6 the pivots 26' and 26" are represented by round bars disposed in spaced parallel relationship to one another and being of equal length. The two round bars representing the pivots are joined by and mechanically connected to opposite ends of the beam 40 which is configured such that the center of moment measurements is in a plane which is equidistant to the axes of rotation of the pivots 26 and perpendicular to the plane which includes the two axes. The deflection of the beam 40 due to the moments of opposite sense is indicated by the phantom line in FIG. 6 and of course is greatly exaggerated for the purpose of illustration. In FIG. 6 the load applying member comprising the pan 12, the rails 22, and the lateral members 24 are missing but it is to be understood that the application of a load pulls downwardly on the straps 32a, 32b, 58a and 58b. The fraction of the load which appears in each of the straps will, of course, depend upon the position of the load on the pan but, as previously described, with the center of the moment measurement in the position indicated the measured moment will be the same irrespective of the position of the load and the division of the load force as between the straps. The downward force which is applied to the pivots by the straps 32 and 58 is opposed by the upward force of the straps 28 and 56 and hence the moments of opposite sense as illustrated in FIG. 26 are produced in the pivots 26. The concept of a strap which is actually wrapped around a pivot member having a cylindrical or tubular configuration may not be necessary in actual application as, from the description of FIGS. 1 through 4, it is apparent that actual angular deflection of the pivots 26 is extremely slight. However, a system of greater angular deflection may of course be constructed using more compliant materials in which circumstances it may be advantageous to employ straps such as those highly schematically shown in FIG. 6 which wrap around the pivot members to at least a limited degree thus to avoid any variation in the effective radius between the center of the pivot member and the point of tangential application of the applied load.

Figure 7:
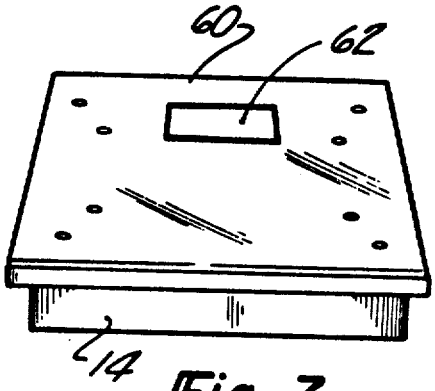
FIG. 7 is a perspective drawing of a split scale device.
Figure 8:
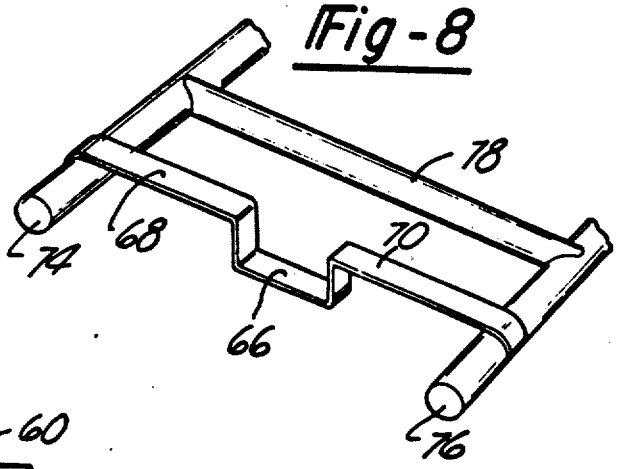
FIG. 8 is a perspective drawing of representative interior details of the split scale device.
Figure 9:
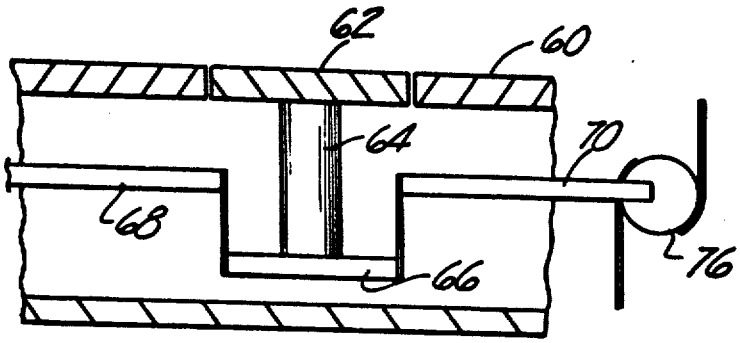
FIG. 9 is a side view in section of a representative portion of the split scale device.

Looking now to FIGS. 7 through 9 a split scale device is shown which permits the same physical apparatus to weigh objects in weigh ranges which differ by an order of magnitude while retaining the original sensitivity and accuracy of the scale. In FIG. 7 the weigh scale apparatus comprises a base 14 identical to the base previously described with reference to FIGS. 1 through 4 and a pan 60 of generally similar configuration to the pan previously described but having a small interior area 62 upon which light and small objects may be placed to weigh according to a scale factor which is ten times the scale factor employed for the surrounding portion of the pan 60. This convenient scale factor variation is provided as follows: pan 60 is interconnected with the pivots in the fashion illustrated in FIGS. 2 through 4 (in this case the pivots are designated by reference characters 74 and 76, respectively) to measure to a scale factor of 1; pan portion 62 is connected through vertical rigid strut 64 and horizontal cross piece 66 to the interior ends of oppositely extending lever arms 68 and 70 which are secured to the pivots 74 and 76 as best shown in FIG. 9. Accordingly, the objects disposed on pan 62 produce forces which are applied to the pivots through fairly long lever arms tending to multiply the moments by a factor of ten. Multiplication of the moment obviously multiplies the sensitivity of the scale. The use of the force multiplying lever arms may be employed with or without the split pan concept shown in FIG. 6 as will be apparent to those skilled in the art.

Various other structural modifications may be employed with or embodied in the apparatus which has been described herein; for example, the beam 40 which is shown in the drawings as being of round or circular cross section stock may readily be replaced with an I-beam having a flexure area defined by a segment from which the flange, both top and bottom, has been removed and in which an oblong aperture may be formed for the receipt of the strain gage resistors. Many other beam configurations will also be apparent. The straps, although preferred, may be replaced in various devices with cables, knife edges, and other structures having good torsional compliance. Also, as shown in FIG. 2, a small vibrator unit 80 may be mechanically interconnected with the floating measurement section of the weigh scale 10 to provide a dithering function; i.e., a low order constant frequency vibration of the pivot construction thus to overcome any hysteretic effects of friction in the apparatus. It may also be desirable to provide means for mechanically nulling out the tare weight of the pan and fasteners to reduce or relax bending stress on the beam except when a load is applied. Although the invention has been described with such specificity as to satisfy the patent statutes, it is to be understood that the descriptions are not to be construed as limiting the inventions as various other implementations thereof will be apparent to those skilled in the art.

The embodiments of the invention in which an exclusive property or privilege is claimed are defined as follows:

1. Floating beam weigh scale apparatus comprising a base, a load receiving member spaced from the base, first and second pivot members disposed between the base and load receiving [members,] *member,* load transmitting means interconnecting the pivots, the base, and the load receiving member to produce moments in the pivots of opposite sense and about spaced axes, a substantially rigid beam connected to and extending between the pivots, and means carried by the beam for producing a signal related to the bending stress therein over the elastic bending range thereof.

2. Apparatus as defined in claim 1 wherein the transmitting means comprises torsionally compliant straps connected in opposing pairs to the pivots, one such strap at each end being connected between the base and the pivot and another such strap at each end being connected between the pivot and the load receiving member to produce the turning moment of the pivot.

3. Apparatus as defined in claim 1 further including means for dithering the pivots by mechanical vibration thereof.

4. Apparatus as defined in claim 1 wherein the beam comprises a solid member of circular cross section over a substantial portion of the length thereof.

5. Apparatus as defined in claim 4 wherein the beam further comprises a central area having opposing and parallel flat surfaces formed therein substantially in the center of the beam for receiving the means for producing the signal upon elastic deformation thereof.

[6. Apparatus as defined in claim 1 further including lever arms connected to the pivots and extending longitudinally of the scale and perpendicular to the pivots and means interconnecting at least a portion of the load receiving member to the lever arms for multiplying the turning moment applied to the pivots by the load applied to the load receiving means.]

[7. Apparatus as defined in claim 6 wherein the load receiving means comprises a pan having a first surface which is directly connected to the pivot members and a second portion at least partially bounded by the first pan portion and connected to the pivots by way of said lever arms thereby to provide a split scale apparatus.]

8. Apparatus as defined in claim 1 wherein the means carried by the beam includes at least one strain gage resistor intimately bonded to the beam and responsive to the bending stress therein to produce a variable electrical resistive characteristic.

9. Apparatus as defined in claim 8 wherein the beam is configured to define an area of reduced cross section between the ends thereof thus to concentrate the bending stress, the strain gage resistor being disposed on the area of reduced cross section.

10. Apparatus as defined in claim 9 wherein the flexure area of reduced cross section is substantially in the center of the beam.

11. Apparatus as defined in claim 1 wherein the base comprises a substantially rectangular assembly of rigid material, the load receiving member comprises a pan and at least one force transmitting rail secured to the pan and extending longitudinally between the spaced pivot members, a pair of laterally extending elements, one of said elements at each end of the longitudinal rail, the force transmitting means comprising straps connected between the laterally extending members and the pivots at each end of the apparatus for producing a turning moment in the pivot when force is applied to the pan.

12. Apparatus as defined in claim 11 wherein the beam is mechanically connected to the pivot members at the centers thereof.

13. Apparatus as defined in claim 12 further including means connected between the base and the pan to prevent longitudinal relative movement therebetween.

14. Apparatus as defined in claim 1 wherein the means for producing the output signal comprises four substantially similar strain gage resistors, two of said resistors being disposed on one side of the beam so as to respond to compression of the beam and the others of said resistors being disposed on the other side of the beam so as to respond to tension in the beam, said four resistors being electrically interconnected into a bridge circuit of such configuration as produce an output signal upon bending of said beam in such a way as to subject two of said resistors to compression forces and the other two of said resistors to tension forces.

15. Apparatus as defined in claim 14 further including digital display means responsive to the signal produced by said bridge circuit to produce a visual indication of the magnitude thereof.

16. Apparatus as defined in claim 14 further including at least two temperature responsive compensating resistors connected to opposite terminals of said bridge circuit to compensate the bridge circuit for temperature variations.

17. In a weigh scale: a load pan, a pair of spaced members, means connecting the pan to said members to produce in said members turning moments of opposite sense and related to loads applied to the pan, a beam of rigid material connected between said spaced members and of substantially greater length than thickness, and means for detecting the extent of bending of said beam as an indication of the magnitude of the load applied to the pan.

18. Apparatus as defined in claim 17 further including mechanical vibrator means for dithering the weigh scale.

*19. Floating beam weigh scale apparatus comprising:*

*a base;*

*a load receiving member spaced from the base;*

*first and second elongated, torsionally rigid pivot members disposed between the base and the load receiving member;*

*a substantially rigid beam having its ends connected substantially centrally of and to the pivot members so that the beam extends between the pivot members;*

*load transmitting means spaced from the beam for interconnecting the pivot members, the base and the load receiving member to produce turning moments in said pivot members of opposite sense and about spaced axes, said turning moments being transmitted to the ends of the beam through the lengths of the pivot members to create bending stress in the beam without applying direct forces to the beam; and*

*means carried by the beam for producing a signal related to the bending stress therein over the elastic bending range thereof.*

*20. Apparatus as defined in claim 19 wherein the load transmitting means comprises torsionally compliant straps connected in opposing pairs to the ends of the pivot members, one such strap of each pair being connected between the base and a pivot members, and another such strap of each pair being connected between the pivot member and*

*the load receiving member, said pairs of straps operative to produce the turning moments in the pivot members.*

*21. In a weigh scale:*

*a load pan:*

*a pair of spaced elongated and torsionally rigid members;*

*a beam of rigid material having its ends connected substantially centrally of and between said spaced members and being of substantially greater length than thickness;*

*means spaced from the beam connecting the pan to said members to produce turning moments therein of opposite sense and related to loads applied to the pan, said turning moments being transmitted to the ends of the beam through said members to create bending stress in the beam without applying direct forces to the beam; and*

*means for detecting the extent of bending of said beam as an indication of the load applied to the pan.*

* * * * *